United States Patent [19]

Keller

[11] Patent Number: 4,477,643

[45] Date of Patent: Oct. 16, 1984

[54] FLUORINATED POLYURETHANES

[75] Inventor: Teddy M. Keller, Alexandria, Va.

[73] Assignee: The United States of America as represented by the Secretary of the Navy, Washington, D.C.

[21] Appl. No.: 602,256

[22] Filed: Apr. 20, 1984

[51] Int. Cl.$^3$ .............................................. C08G 18/38
[52] U.S. Cl. ....................................... 528/70; 528/65
[58] Field of Search .................................. 528/70, 65

[56] References Cited

U.S. PATENT DOCUMENTS

| | | | |
|---|---|---|---|
| 2,911,390 | 11/1959 | Smith | 260/77.5 |
| 3,282,896 | 11/1966 | Einberg | 260/47 |
| 3,304,334 | 2/1967 | Jones | 260/618 |
| 3,852,222 | 12/1974 | Field et al. | 260/2 EP |
| 3,872,058 | 3/1975 | Gresham | 260/77.5 AM |
| 4,321,173 | 3/1982 | Schuhmacher et al. | 525/453 |

*Primary Examiner*—Maurice J. Welsh
*Attorney, Agent, or Firm*—Robert F. Beers; William T. Ellis; Barry A. Edelberg

[57] ABSTRACT

Novel polymers and prepolymers are formed by reacting a fluorinated tertiary polyfunctional alcohol with an aliphatic diisocyanate or a biuret derivative of said diisocyanate in the presence of a suitable catalyst and in the absence of solvent. The novel polymers and prepolymers exhibit low surface energy properties and may be used in non-fouling coatings, foams and elastomers.

20 Claims, No Drawings

FLUORINATED POLYURETHANES

BACKGROUND OF THE INVENTION

This invention relates in general to low surface energy fluoropolymers and more specifically to fluorinated polyurethanes which are the condensation products of fluorinated tertiary polyfunctional alcohols and aliphatic diisocyanates.

Perfluorinated polymers have long been employed as low surface energy coatings and materials. These polymers, despite their relatively high costs, have found uses in O-rings, gaskets, diaphragms, fuel tank sealants, and coatings. The high cost of these polymers, however, has limited the use of these polymers to relatively expensive items. Much of this cost may be attributed to the expense of perfluorination. A low surface energy polymer which is not highly fluorinated would eliminate much of this expense.

The isocyanates, containing the highly unsaturated —N=C=O group, are highly reactive with a host of compounds and may also react with themselves. Reaction can occur with almost any compound possessing a hydrogen atom that may be replaced by sodium and can occur with a few other compounds having hydrogen atoms not readily replaced by sodium. In such a reaction, the hydrogen becomes attached to the nitrogen of the isocyanate and the remainder of the active hydrogen compound becomes attached to the carbonyl carbon:

R—N=C=O + HOR → RNHCOOR

In many cases this addition product is quite stable. In special cases the addition product is only moderately stable and may decompose to form the initial reactant again or may decompose to other products.

In most reactions, especially with active hydrogen compounds, the aromatic isocyanates are more reactive than are the aliphatic isocyanates. In addition, substitution of electronegative groups on the aromatic ring enhances the reactivity whereas electropositive groups reduce the reactivity of the isocyanate. As would be expected, steric hindrance on either the isocyanate or the active hydrogen compound will retard the reaction. All of the reactions are subject to catalysis by acids and by bases; certain metal compounds are exceptionally powerful catalysts. In light of the great variety of reactions possible, it is fortunate that conditions which permit highly selective control of the reactions actually occurring can usually be chosen. It is this wide range of reactions possible, plus the host of reactive materials available, combined with good control of the desired reactions that permit one to tailor make a variety of polymers.

Although most urethane coating systems are largely based on aromatic diisocyanates due to their excellent properties, they typically exhibit poor color stability when exposed to ultraviolet radiation. Additives improve their performance, but only delay the color change. It has been shown that by using aliphatic diisocyanates in place of aromatic diisocyanates such as toluene diisocyanates, polyurethane coatings with outstanding light stability could be produced. Hexamethylene diisocyanate has been used for many years in experimental programs. However, owing to its high vapor pressure, a polyisocyanate of biuret structure based on hexamethylene diisocyanate is used commercially. This compound is produced from the reaction of the diisocyanate with water. This polyisocyanate:

3OCN(CH$_2$)$_6$NCO + H$_2$O ⟶

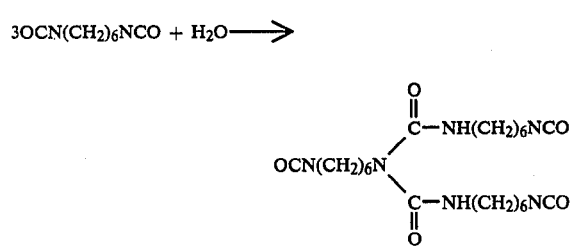

still retains the aliphatic characteristics desirable for a nonyellowing coating and also has a very low vapor pressure, thus reducing the hazards of unmodified hexamethylene diisocyanate.

OBJECTS OF THE INVENTION

It is a principal object of this invention to provide a new class of fluorinated polyurethanes.

It is another object of this invention to produce a new class of fluorinated polyurethanes having exceptional heat, light, and chemical resistance and a low surface energy.

It is a further object of this invention to produce fluorinated polyurethane prepolymers from a fluorinated tertiary polyfunctional alcohol and an aliphatic diisocyanate.

It is yet another object of this invention is to provide new fluorinated polyurethane prepolymers terminated with both diisocyanate and dihydroxyl groups.

It is a still further object of this invention to provide low surface energy fluorinated polyurethane resins at a reduced cost.

SUMMARY OF THE INVENTION

These and other objects are achieved by reacting a fluorinated tertiary polyfunctional alcohol with an aliphatic diisocyanate in the presence of a polyurethane-forming catalyst.

DETAILED DESCRIPTION OF THE PREFERRED EMBODIMENT

The tertiary fluorinated polyfunctional alcohols employed in this invention typically have the structure:

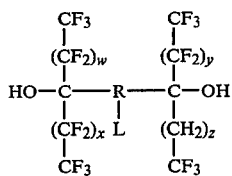

wherein R is any branched or unbranched, saturated or unsaturated aromatic or aliphatic hydrocarbon di- or tri-radical; w, x, y and z are integers from 0–10 and may be the same or different; L represents —H,

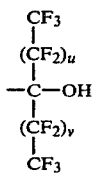

or —(CF$_2$)$_v$CF$_3$ where u and v are integers from 0 to 10 and may be the same or different.

Preferably, R is a meta- or para-substituted benzene diradical or a benzene triradical. Most preferably, R is a meta- or para-substituted benzene diradical. Preferably, w, x, y and z are the same. Most preferably, w, x, y and z are 0. Preferably, u and v are the same. More preferably, u and v are 0. Most preferably L is —H.

Examples of useful aromatic alcohol reactants are 1,3-bis (2-hydroxyhexafluoro-2-propyl)benzene, 1,4-bis(2-hydroxyhexafluoro-2-propyl)benzene and 1,3,5-tris(2-hydroxyhexafluoro-2-propyl)benzene and mixtures thereof. Often, commercially available preparations of the 1,3 bis alcohol include some of the 1,4 bis compound as well, typically about 10 weight percent. This impurity is of little consequence, and the 1,3 bis compound need not be further purified to give consistent results. If the tris compound is used, cross-linking will occur, resulting in a polymer which is insoluble in common organic solvents, such as methylene chloride.

The diisocyanates employed in this invention typically have the structure:

OCN—R$_a$—NCO where R represents a fluorinated or unfluorinated aliphatic (alkylene or alkylenylene) diradical having no fluorinated carbons adjacent to the isocyanate groups or any cycloaliphatic hydrocarbon diradical such as cyclopentylene and cyclohexylene. Preferably, R$_a$ is an aliphatic hydrocarbon diradical having 2 to 8 carbons or a cycloaliphatic diradical. Most preferably R$_a$ is an aliphatic having 6 carbons. R$_a$ is preferably unfluorinated. The biuret derivative of the diisocyanates may also be employed where a cross-linked polymer or prepolymer is desired.

To produce polyurethanes having a relatively high average molecular weight, several factors must be taken into account. First of all, the condensation reaction must be specific and must take place in high yield. Furthermore, high purity is essential if high molecular weight linear polyurethanes are to be obtained. Monofunctional impurities would act as stoppers, thereby resulting in low molecular weight polymers. The reactant balance would also be upset by the presence of water. Essentially equimolar quantities of the diisocyanate and alcohol must be used to obtain high molecular weight, linear polyurethanes. Excess diisocyanate appears to be less harmful than excess alcohol. This apparently is due to the many potential side reactions which can occur to consume excess diisocyanate. Reaction times of 1-2 hours were found necessary to obtain high molecular weight polyurethanes. Long term heating, however, often resulted in degradation of the polyurethanes. If these requirements are not totally met, then lower to moderate molecular weight polyurethanes will be obtained.

The novel fluorinated polyurethanes of the present invention are generally prepared by reacting approximately stoichiometric ratios of the fluorinated tertiary alcohol and an aliphatic diisocyanate. In order to obtain a tough polymer, the temperature of the reaction medium must exceed 80° C. for an extended period. Since the resulting clear polyurethane is insoluble in common organic solvents, it is not known whether crosslinking occurs through a secondary reaction of the isocyanate group with the urethane N—H groups and/or through hydrogen bonding involving the urethane N—H and C=O groups.

This invention also includes the formation of prepolymers for use as coatings or adhesives. Isocyanate-terminated prepolymers can be prepared by using a molar excess of diisocyanate. This prepolymer can be subsequently advanced with active hydrogen containing compounds such as diamines, diols, dithiols, etc. Hydroxyl-terminated prepolymers can be prepared by using a molar excess of alcohol. This prepolymer can be subsequently advanced with additional diisocyanate.

The synthetic scheme is shown below:

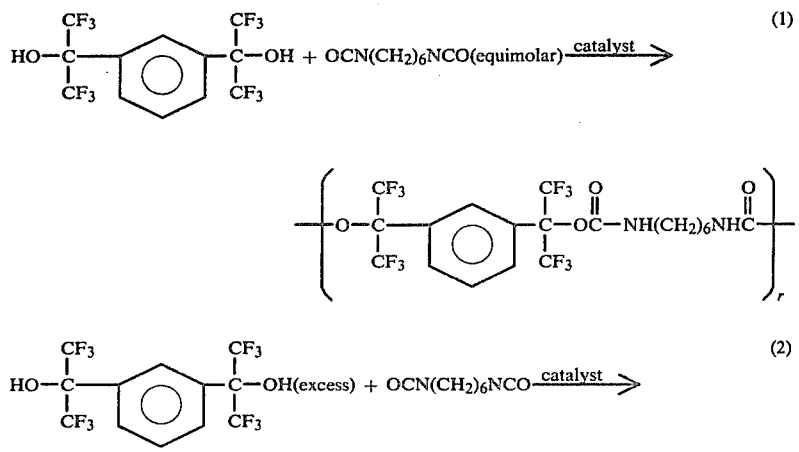

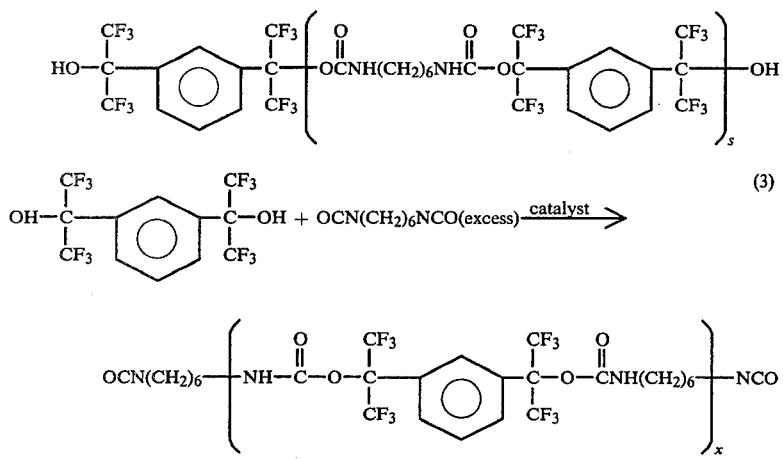

(3)

wherein r is an arbitrarily large integer and s and t are integers less than r and dependent upon the relative ratios of the reactants. Typically, s and t are between 1 and 100. Most preferably s and t are between 1 and 15.

In the present invention, the polyurethanes are prepared by the reaction of a diisocyanate with a fluorinated tertiary polyfunctional alcohol in the neat state under an inert atmosphere. A polyurethane-forming catalyst (defined as a catalyst commonly used to catalyze polymerization reactions between alcohols and diisocyanates, e.g., dibutyltin dilaurate and 1,4-diazobicyclo (2.2.2) octane (also known as Dabco TM )) should be present during the reaction. If a prepolymer is desired, careful control of the polymerization is necessary in order to avoid crosslinking resulting in an insoluble polymer product. Typically, the reaction is run at 50°–150° C., preferably at 50°–80° C. and most preferably at 50°–70° C. for the polyurethane prepolymers. When stoichiometric ratios of the reactants are interacted, higher temperatures are typically required to ensure complete reaction. The resulting clear polyurethanes are tough, rubbery, and insoluble in common organic solvents, indicative probably of hydrogen bonding of the urethane N—H and C=O groups and/or crosslinking involving the urethane N—H groups and the isocyanate groups.

In this specification and the claims that follow, the term "stoichiometric ratio" refers to a ratio of reactants which, when reacted according to the process disclosed herein for synthesizing polyurethane polymers yields a polymer which is insoluble in methylene chloride. The term "non-stoichiometric ratio" or a specified molar excess of a reactant refers to a ratio of reactants which when reacted according to the process disclosed herein for synthesizing non-crosslinking polyurethane prepolymers yields a prepolymer which is soluble in methylene chloride.

The new fluorinated polymers and prepolymers exhibit good wetting properties and the prepolymers adhere strongly to Teflon TM . Because the novel polymers need not be highly fluorinated but need only contain trifluoromethyl groups (on at least 2 alcoholic carbons), these polymers are much cheaper to produce than standard fluorinated acrylics.

EXAMPLES

Having described the invention in general, the following examples are being given to illustrate the principles of the invention and are not intended to limit the scope of the invention in any manner.

Example 1

1,3-Bis(2-hydroxyhexafluoro-2-propyl) benzene (0.505 g, 1.23 mmol), 1,6-hexamethylene diisocyanate (0.209 g, 1.24 mmol), and 2 drops of dibutyltin dilaurate were weighed into a 5 ml flask and heated at 50° C. for 24 hours and at 75° C. for 24 hours under a dry nitrogen atmosphere. A small quantity of the clear, brittle solid was dissolved in 2-butanone (MEK) and concentrated onto an NaCl infrared disk. An infrared spectrum of the resulting film showed a small absorption at 2275 cm$^{-1}$ indicating the incomplete reaction of the isocyanate group. No further change in the infrared spectrum was observed upon further heating of the sample at 75° C. A number average molecular weight, M$_n$, of 2536 as determined by Vapor Phase Osmometry confirms the incomplete reaction and the formation of low molecular weight polyurethanes. The reaction mixture was then heated at 90° C. for 24 hours. Upon examination of product mixture at 90° C., the polymer was soft and rubbery. When cooled, the fluorinated polyurethane was tough and somewhat flexible. Moreover, the polyurethane was now insoluble in ethyl acetate, 2-butanone, methylene chloride, acetone and other common organic solvents, indicating probably that some type of crosslinking had occurred.

Example 2

Using the method of Example 1, 1,3-bis (2-hydroxyhexafluoro-2-propyl) benzene (0.506 g, 1.23 mmol), 1,6-hexamethylene diisocyanate (0.207 g, 1.24 mmol), and 2 drops of dibutyltin dilaurate were weighed into a 5 ml flask and heated at 45° C. for 24 hours and at 75° C. for 24 hours under a dry nitrogen atmosphere. The clear, brittle solid was then heated at 80° C. for 8 hours. The sample now appeared tougher and somewhat rubbery. An extremely weak absorption at 2275 cm$^{-1}$ indicated that some isocyanate groups were still present. Moreover, the clear polymer was not only partially soluble in common organic solvents. The sample was then heated at 90° C. for 18 hours. The polyurethane was now completely insoluble in all organic solvents.

Example 3

1,3-Bis(2-hydroxyhexafluoro-2-propyl) benzene (1.997 g, 4.87 mmol), 1,6-hexamethylene diisocyanate (1.112 g, 6.62 mmol), and 2 drops of dibutyltin dilaurate were weighed into a 5 ml flask and heated at 50° C. for 24 hours and at 60° C. for 24 hours under a dry nitrogen atmosphere. The clear, brittle polyurethane prepolymer was soluble in common organic solvents. An infrared spectrum showed the absence of absorptions centered at 3600 and 3535 cm$^{-1}$, attributed to free and associated hydroxyl groups, respectively. Further heating at 75° C. for 8 hours did not cause any observed change in the intensity of the isocyanate (2275 cm$^{-1}$) and carbonyl groups (1750 and 1690 cm$^{-1}$). The number average molecular weight $\overline{M}_n$ was 2257 as determined by Vapor Phase Osmometry.

Another sample of 1,3-bis (2-hydroxyhexafluoro-2-propyl) benzene (1.002 g, 2.44 mmol), 1,6-hexamethylene diisocyanate (0.546 g, 3.25 mmol), and 2 drops of dibutyltin dilaurate was given the same heat treatment as described above. The clear solid was soluble in common organic solvents. As determined from an infrared spectrum, the hydroxyl groups had been completely consumed. The fluorinated polyurethane prepolymer terminated by isocyanate groups was then heated at 85° C. for 24 hours. The prepolymer was now completely insoluble in common solvents indicating that some crosslinking had probably occurred.

Example 4

1,3-Bis (2-hydroxyhexafluoro-2-propyl) benzene (1.343 g, 3.28 mmol), 1,6-hexamethylene diisocyanate (0.408 g, 2.43 mmol), and 2 drops of dibutyltin dilaurate were weighed into a 5 ml flask and heated at 50° C. for 24 hours and at 65° C. for 24 hours under a nitrogen atmosphere. The polyurethane prepolymer terminated by hydroxyl groups was soluble in common organic solvents. The number average molecular weight, $\overline{M}_n$, was 2015 as determined by Vapor Phase Osmometry.

Obviously many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. The product of the reaction of a first reactant comprising a fluorinated tertiary polyfunctional alcohol and a second reactant comprising an aliphatic or cycloaliphatic diisocyanate or a biuret derivative of said diisocyanate, said reactants having been reacted in the neat state in the presence of a polyurethane-forming catalyst.

2. The product of claim 1 where said diisocyanate comprises:

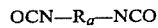
OCN—R$_a$—NCO wherein R$_a$ represents an aliphatic hydrocarbon diradical having 2 to 8 carbons or a cycloaliphatic hydrocarbon diradical.

3. The product of claim 2 wherein said second reactant comprises:

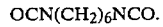
OCN(CH$_2$)$_6$NCO.

4. The product of claim 3 wherein said reactants are reacted in a non-stoichiometric ratio.

5. The product of claim 4 wherein said first reactant and said second reactant have been reacted at about 50°–150° C.

6. The product of claim 5 wherein a molar excess of said first reactant is reacted with said second reactant.

7. The product of claim 5 wherein a molar excess of said second reactant is reacted with said first reactant.

8. The product of claim 1 wherein said first reactant comprises:

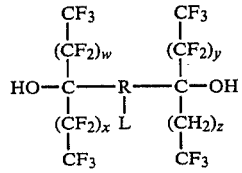

wherein R is a hydrocarbon di- or triradical; w, x, y and z are integers from 0 to 10 and may be the same or different and L represents —H,

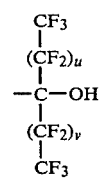

or —(CF$_2$)$_v$CF$_3$ wherein u and v are integers from 0–10 and may be the same or different.

9. The product of claim 8 wherein R is a meta- or para-substituted benzene diradical or a benzene triradical and w, x, y and z are the same.

10. The product of claim 9 wherein L represents —H.

11. The product of claim 10 wherein w, x, y and z are 0.

12. The product of claim 9 wherein said first and said second reactant are reacted in a stoichiometric ratio.

13. The product of claim 10 wherein said first and said second reactant are reacted in a non-stoichiometric ratio.

14. The product of claim 13 wherein a molar excess of said first reactant is reacted with said second reactant.

15. The product of claim 14 wherein a molar excess of said second reactant is reacted with said first reactant.

16. The product of the reaction of a first reactant comprising 1,3 bis (2-hydroxyhexafluoro-2-propyl) benzene, 1,4-bis(2-hydroxyhexafluoro-2-propyl benzene or a mixture thereof with a second reactant comprising 1,6 hexamethylene diisocyanate, said reactants having been reacted in the neat state at between about 50°–150° C. in the presence of a polyurethane-forming catalyst.

17. A process for producing fluorinated polyurethanes, the steps of which comprise:
    selecting a first reactant comprising a fluorinated tertiary polyfunctional alcohol;
    selecting a second reactant comprising a diisocyanate or a biuret derivative thereof;
    reacting said first and second reactants in the neat state in the presence of a polyurethane-forming catalyst.

18. The process of claim 17 wherein said reacting step comprises reacting said first and second reactants in a stoichiometric ratio.

19. The process of claim 17 wherein said reacting step comprises reacting said first and second reactants in a non-stoichiometric ratio.

20. The process of claim 19 wherein said reacting step comprises reacting a molar excess of said first reactant with said second reactant.

* * * * *